United States Patent
Michalski et al.

(10) Patent No.: US 7,126,103 B2
(45) Date of Patent: Oct. 24, 2006

(54) METHOD, SYSTEM AND COMPUTER PROGRAM FOR CONTROLLING A NIGHT VISION SYSTEM

(75) Inventors: Mark Michalski, West Springfield, MA (US); Paul N. Marshall, Avon, CT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/070,676

(22) Filed: Mar. 2, 2005

(65) Prior Publication Data

US 2006/0197010 A1    Sep. 7, 2006

(51) Int. Cl.
*H01J 31/50* (2006.01)
*H01J 43/30* (2006.01)
*H04N 5/225* (2006.01)

(52) U.S. Cl. .............................. 250/214 VT; 250/330; 250/207; 348/217.1

(58) Field of Classification Search ................ 398/108; 348/216.1, 217, 217.1; 250/214 VT, 207, 250/330, 483.1; 359/40, 630–637
See application file for complete search history.

(56) References Cited

U.S. PATENT DOCUMENTS

| 5,218,194 A | * | 6/1993 | Garbi et al. .......... 250/214 VT |
| 5,648,862 A | * | 7/1997 | Owen ...................... 398/128 |
| 5,686,722 A | * | 11/1997 | Dubois et al. .............. 250/226 |

* cited by examiner

*Primary Examiner*—Stephone B. Allen
*Assistant Examiner*—Suezu Ellis
(74) *Attorney, Agent, or Firm*—Cantor Colburn LLP

(57) ABSTRACT

A night vision system including an image intensifier receiving light. A current detector monitors current at the image intensifier. A data filter is coupled to the current detector and determines if the received light includes coded light pulses matching a predetermined code. A controller is coupled to the data filter. The controller alters a parameter of the night vision system if the received light includes coded light pulses matching a predetermined code.

19 Claims, 2 Drawing Sheets

METHOD, SYSTEM AND COMPUTER PROGRAM FOR CONTROLLING A NIGHT VISION SYSTEM

BACKGROUND OF THE INVENTION

Night vision systems are used in a number of applications, including military, industrial, commercial, etc. In general, the systems operate by multiplying light received at an image intensifier tube to generate a visible image. There are situations where it is desirable to disable a night vision system remotely. For example, in a military setting, if a night vision system is acquired by enemy personnel, it is desirable to disable the night vision system. Thus, there is a need in the art for a night vision system having the capability of being controlled remotely.

BRIEF SUMMARY OF THE INVENTION

An embodiment of the invention is a night vision system including an image intensifier receiving light. A current detector monitors current at the image intensifier. A data filter is coupled to the current detector and determines if the received light includes coded light pulses matching a predetermined code. A controller is coupled to the data filter. The controller alters a parameter of the night vision system if the received light includes coded light pulses matching a predetermined code.

Another embodiment of the invention is a method for controlling a night vision system including receiving light at an image intensifier and monitoring current at the image intensifier. It is determined if the received light includes coded light pulses matching a predetermined code. A parameter of the night vision system is altered if the received light includes coded light pulses matching a predetermined code. A computer program for implementing the method is also disclosed.

DETAILED DESCRIPTION

Figure 1:
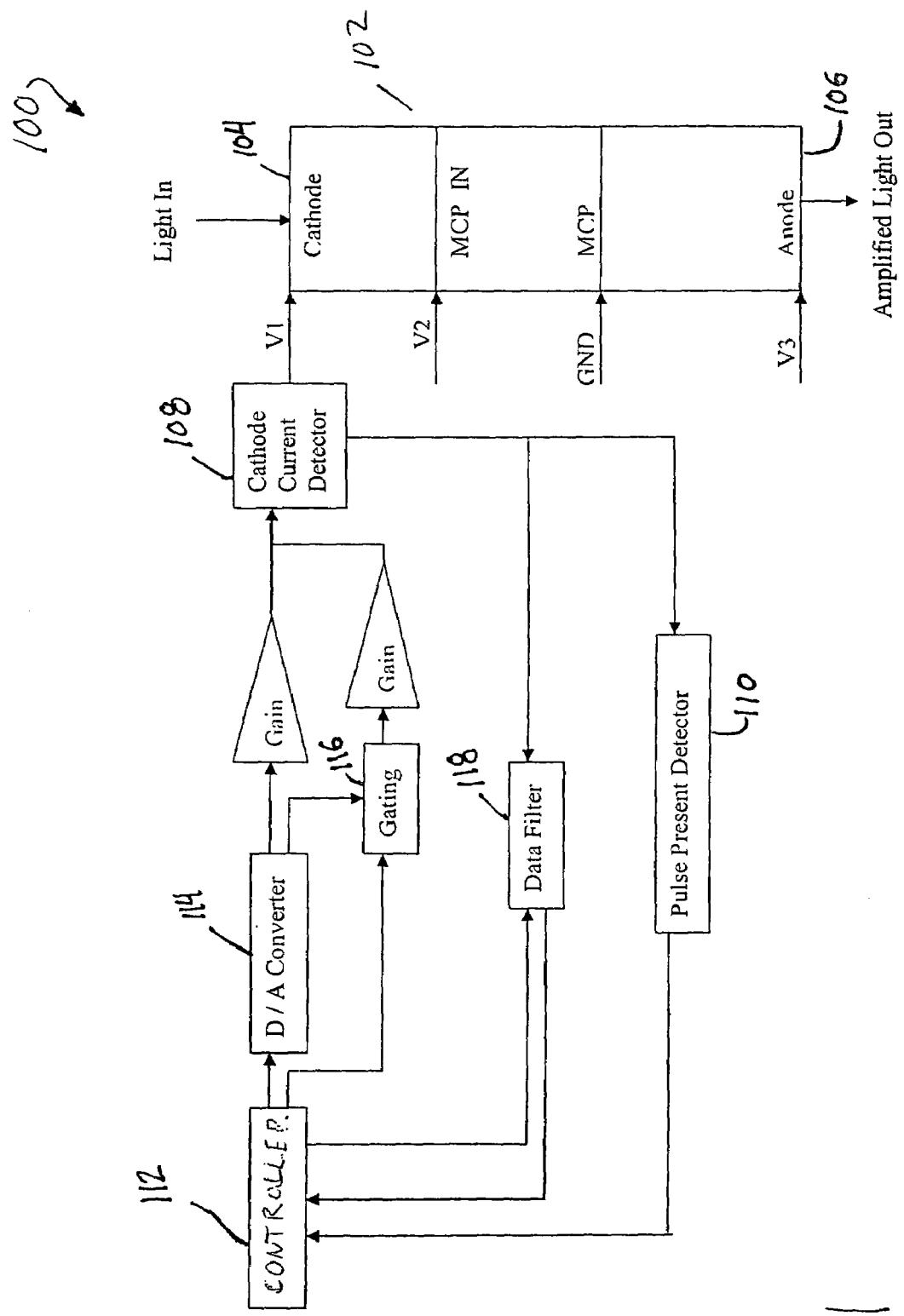
FIG. 1 is a block diagram of a night vision system in an exemplary embodiment of the invention.

FIG. 1 is a block diagram of a night vision system 100 in an exemplary embodiment of the invention. Night vision system 100 includes an image intensifier 102 that receives light at cathode 104 and outputs amplified light at anode 106. Image intensifier 102 multiplies the amount of incident light received at cathode 104 to provide a visible image. These devices typically require some low-level residual light, such as moon or star light, in which to operate. However, the present generation of image intensifiers can also make visible the light from the near-infrared (invisible) portion of the light spectrum. As used herein, the term "light" means electromagnetic radiation, regardless of whether or not this light is visible to the human eye. The image intensification process involves conversion of the received ambient light into electron patterns and projection of the electron patterns onto a phosphor screen for conversion of the electron patterns into light visible to the observer. This visible light can then be viewed directly by the operator or through a lens provided in the eyepiece of the system.

Embodiments of the invention use a pattern of light pulses to instruct the night vision system 100 to shut down, thereby by disabling the night vision system 100. Communications other than a disable message may be transmitted to the night vision system 100 which are described in further detail herein.

In operation, the cathode 104 receives light being pulsed at a predetermined pulse rate. A cathode current detector 108 monitors the cathode 104 and sends the current pulse information to the pulse present detector 110. The pulse present detector 110 determines that light pulses are being received at a predetermined pulse rate indicating that the light pulses are an instruction to the night vision system 100.

The pulse present detector 110 sends a pulse present signal to a controller 112. The controller 112 may be a microprocessor-based controller that executes program instructions stored on a storage medium accessible by the controller. The controller 112 may also be implemented using hardware, firmware, ASIC, etc. Controller 112 switches to the high power receive data mode by sending commands to D/A converter 114 and gating circuit 116. Controller 112 also sends a command to data filter 118 to receive pulse data.

The cathode 104 receives light being pulsed at a predetermined coded pulse rate. The cathode current detector 108 sends the coded current pulse information to the data filter 118. The data filter 118 determines that the received coded light pulses match one or more predetermined codes. If the coded light pulses correspond to a predetermined code, the data filter 118 sends either the coded signal or a modified signal to the controller 112.

A number of different messages may be sent using the coded light pulses. The controller 112 interprets the coded or modified signal from data filter 118 according to its internal lock-data set. If a shut-down code is received, the controller 112 writes a cathode lock-out signal to its internal lock-out EEPROM, and instructs the D/A converter 114 and gating circuit 116 to shut-off the cathode 104 thereby making the tube dark and disabling the night vision system 100. The controller 112 cannot return to normal operation until the internal lock-out EEPROM is changed back to its run value. The EEPROM can only be rewritten at designated repair facilities. Changing batteries or turning the unit on or off will not change the EEPROM value. The coded light pulses would be directed away from friendly troops and be sent in high frequency bursts too short to be visible to the human eye.

Another message that may be transmitted to the night vision system 100 is a new lock-out code. If a receive new lock-out code instruction is detected, a new lock-out code is sent to replace the old lock-out code with the new one and then revert back to low power normal operation mode. The new lock-out code allows the lock-out code to be updated in the field.

Another message that may be transmitted to the night vision system 100 is an immunization message. If an immunize for a time period (e.g., 2 hours) instruction is detected, the night vision system 100 will ignore any received shut-down code for the time period in the normal low power operation mode. The immunize code provides the ability to guard against the shut-down code being received through reflections by being immunized. That is, night vision systems 100 that are immunized will not be disabled by a shut-down code. This allows night vision systems 100 in the hands of friendly troops to be immunized from a lock-out code.

In alternate embodiments, similar functions are implemented based on signals detected by current detector 108 at the microchannel plate (MCP) in point or at the MCP-out point or at the anode point shown in FIG. 1. These other points would be substantially slower in operation making the communication signals visible. In other embodiments, similar functions are implemented based on screen current signals detected by current detector 108 at the phosphor screen.

In alternate embodiments, the pulse present detector 110 is eliminated. In this mode, the night vision system 100 would need to be in high power mode to continuously monitor the cathode for the coded light pulses. The pulse present detector 110 detects the coded light pulses and then instructs the night vision system 100 to enter high power mode thereby conserving power.

Figure 2:
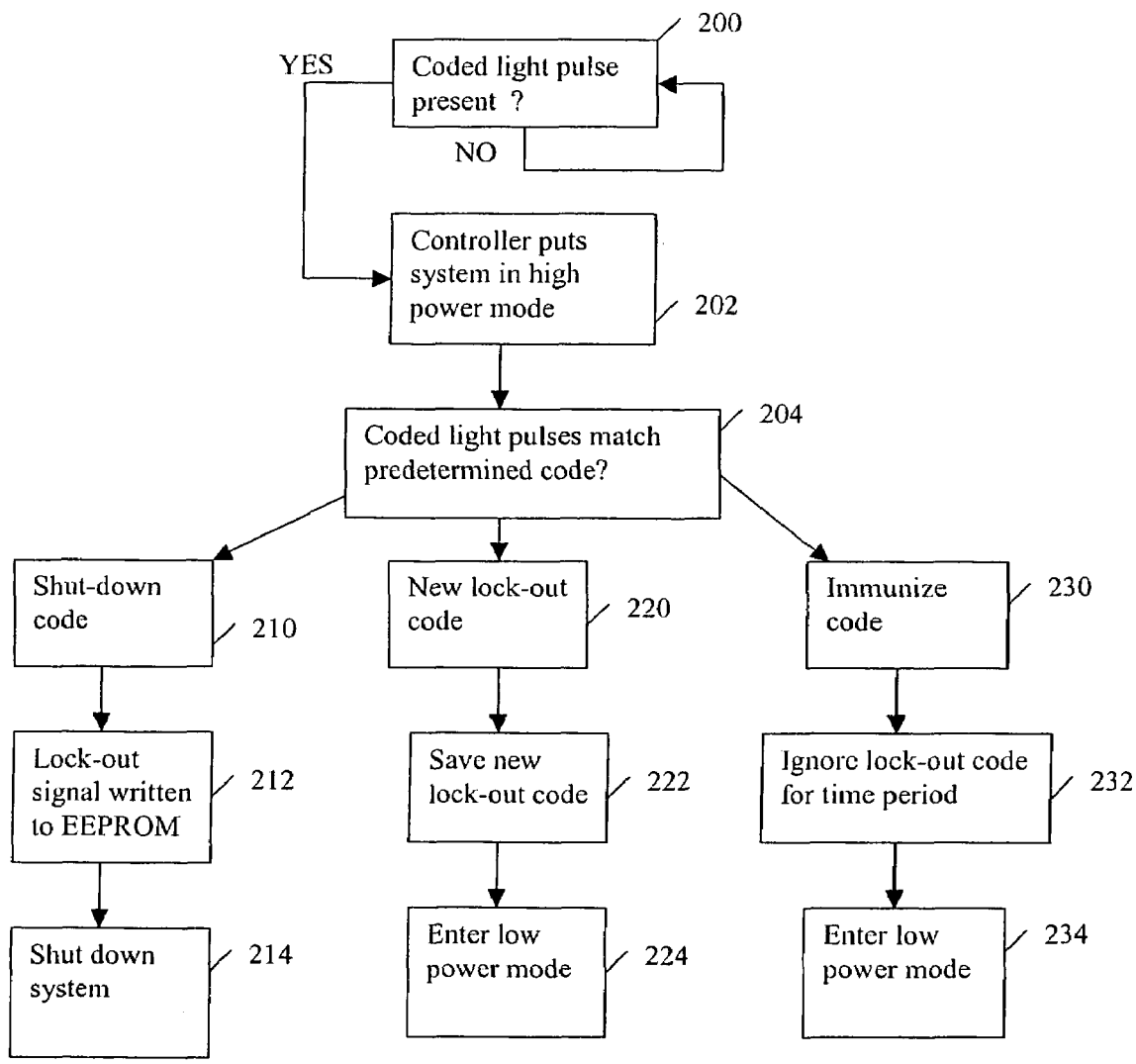
FIG. 2 is a flowchart of an exemplary process of operating the night vision system.

FIG. 2 is a flowchart of a process of operating the night vision system 100 of FIG. 1. The process starts at step 200 where the pulse present detector 110 monitors for incoming coded light pulses. Once coded light pulses are received, flow proceeds to step 202 where the controller 112 places the night vision system 100 in high power mode. At step 204, the data filter 118 determines if the coded light pulses match a predetermined code. As described, three exemplary codes may be sent to the night vision system 100. It is understood that other messages may be sent to the night vision system 100, and embodiments of the invention are not limited to the messages disclosed herein. In response to coded light pulses matching a predetermined code, the controller 112 alters a parameter of the night vision system.

As shown in FIG. 2, the coded light pulses may initiate a night vision system shut-down as shown in steps 210–214. Alternatively, the coded light pulses may initiate storage of a new lock-out code as shown in steps 220–224. Alternatively, the coded light pulses may initiate immunization of the night vision system from shut-down for a period of time as shown in steps 230–234.

As described above, the embodiments of the invention may be embodied in the form of processor-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A night vision system comprising:
an image intensifier receiving light;
a current detector monitoring current at the image intensifier;
a data filter coupled to the current detector, the data filter determining if the received light includes coded light pulses matching a predetermined code; and
a controller coupled to the data filter, the controller altering a parameter of the night vision system if the received light includes coded light pulses matching a predetermined code;
the parameter altered by the controller being related to the night vision system responding to a shut-down code.

2. The night vision system of claim 1 wherein:
the current detector monitors current at a cathode of the image intensifier.

3. The night vision system of claim 1 wherein:
the current detector monitors current at a microchannel plate of the image intensifier.

4. The night vision system of claim 1 wherein:
the current detector monitors screen current.

5. The night vision system of claim 1 further comprising:
a pulse present detector coupled to the current detector and the controller, the pulse present detector detecting the presence of coded light pulses and signaling the controller to initiate receiving data from the image intensifier.

6. A night vision system comprising:
an image intensifier receiving light;
a current detector monitoring current at the image intensifier;
a data filter coupled to the current detector, the data filter determining if the received light includes coded light pulses matching a predetermined code; and
a controller coupled to the data filter, the controller altering a parameter of the night vision system if the received light includes coded light pulses matching a predetermined code wherein
the parameter altered by the controller includes disabling the night vision system in response to the coded light pulses matching a predetermined shut-down code.

7. A night vision system comprising:
an image intensifier receiving light;
a current detector monitoring current at the image intensifier;
a data filter coupled to the current detector, the data filter determining if the received light includes coded light pulses matching a predetermined code; and
a controller coupled to the data filter, the controller altering a parameter of the night vision system if the received light includes coded light pulses matching a predetermined code; wherein
the parameter altered by the controller includes establishing a new lock-out code in response to the coded light pulses matching a predetermined update lock-out code.

8. A night vision system comprising:
an image intensifier receiving light;
a current detector monitoring current at the image intensifier;
a data filter coupled to the current detector, the data filter determining if the received light includes coded light pulses matching a predetermined code; and
a controller coupled to the data filter, the controller altering a parameter of the night vision system if the received light includes coded light pulses matching a predetermined code; wherein the parameter altered by the controller includes immunizing the night vision system from future shut-down codes in response to the coded light pulses matching a predetermined update lock-out code.

9. The night vision system of claim 8 wherein:
the controller immunizes the night vision system from future shut-down codes for a period of time.

10. A method for controlling a night vision system, the method comprising:
receiving light at an image intensifier;
monitoring current at the image intensifier;
determining if the received light includes coded light pulses matching a predetermined code; and
altering a parameter of the night vision system if the received light includes coded light pulses matching a predetermined code;
the parameter altered being related to the night vision system responding to a shut-down code.

11. The method of claim 10 wherein:
the current is monitored at a cathode of the image intensifier.

12. The method of claim 10 wherein:
the current is monitored at a microchannel plate of the image intensifier.

13. The method of claim 10 wherein:
the current monitored is screen current.

14. The method of claim 10 further comprising:
detecting the presence of coded light pulses and initiating receiving data from the image intensifier.

15. A method for controlling a night vision system, the method comprising:
receiving light at an image intensifier;
monitoring current at the image intensifier;
determining if the received light includes coded light pulses matching a predetermined code; and
altering a parameter of the night vision system if the received light includes coded light pulses matching a predetermined code;
wherein
altering a parameter includes disabling the night vision system in response to the coded light pulses matching a predetermined shut-down code.

16. A method for controlling a night vision system, the method comprising:
receiving light at an image intensifier;
monitoring current at the image intensifier;
determining if the received light includes coded light pulses matching a predetermined code; and
altering a parameter of the night vision system if the received light includes coded light pulses matching a predetermined code;
wherein
altering a parameter includes establishing a new lock-out code in response to the coded light pulses matching a predetermined update lock-out code.

17. A method for controlling a night vision system, the method comprising:
receiving light at an image intensifier;
monitoring current at the image intensifier;
determining if the received light includes coded light pulses matching a predetermined code; and
altering a parameter of the night vision system if the received light includes coded light pulses matching a predetermined code;
wherein
altering a parameter includes immunizing the night vision system from future shut-down codes in response to the coded light pulses matching a predetermined update lock-out code.

18. The method of claim 17 wherein:
the night vision system is immunized from future shut-down codes for a period of time.

19. A storage medium encoded with machine-readable computer program code for controlling a night vision system, the storage medium including instructions for causing a system to implement a method comprising:
receiving light at an image intensifier;
monitoring current at the image intensifier;
determining if the received light includes coded light pulses matching a predetermined code; and
altering a parameter of the night vision system if the received light includes coded light pulses matching a predetermined code;
the parameter altered being related to the night vision system responding to a shut-down code.

* * * * *